(No Model.) 2 Sheets—Sheet 2.

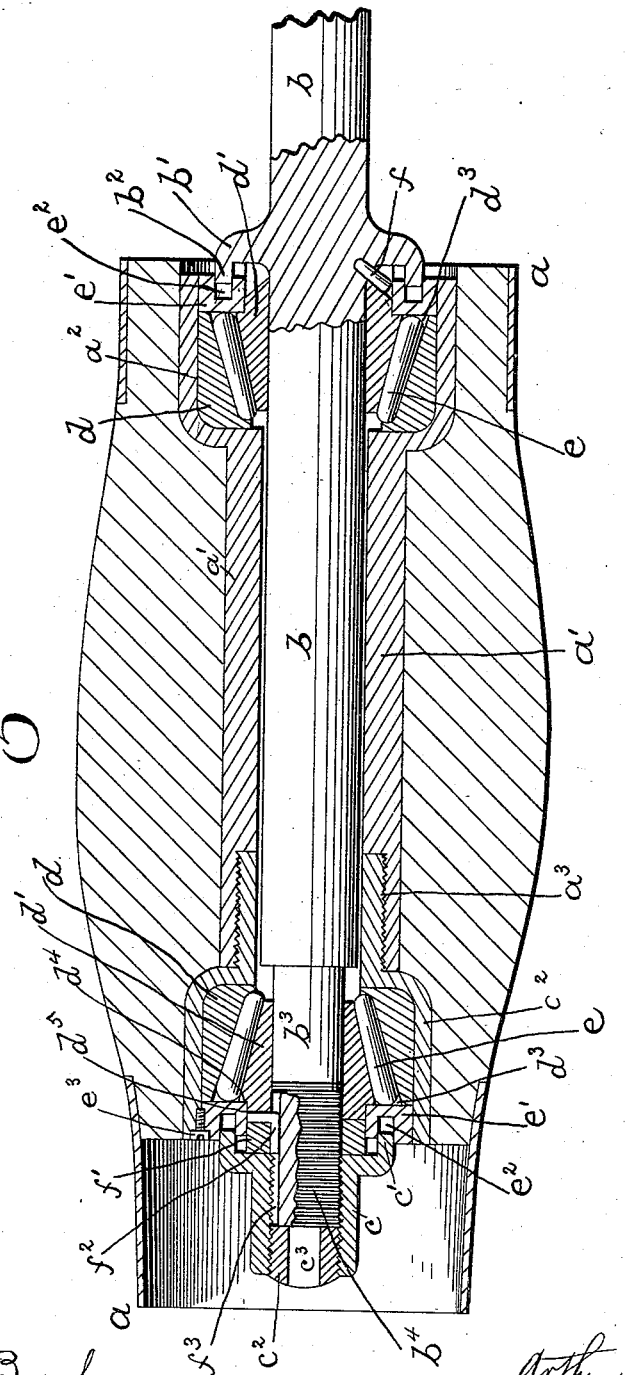

A. W. GRANT.
ANTIFRICTION BEARING.

No. 543,301. Patented July 23, 1895.

WITNESSES:
Frank M. Burnham.
Chas. I. Welch

INVENTOR
Arthur W. Grant
BY
ATTORNEYS:

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

ANTIFRICTION-BEARING.

SPECIFICATION forming part of Letters Patent No. 543,301, dated July 23, 1895.

Application filed November 19, 1894. Serial No. 529,333. (No model.)

*To all whom it may concern:*

Be it known that I, ARTHUR W. GRANT, a citizen of the United States, residing at Springfield, in the county of Clark and State of Ohio, have invented certain new and useful Improvements in Antifriction-Bearings for Vehicles, of which the following is a specification.

My invention relates to antifriction-bearings, and it especially relates to such bearings as are adapted in their constructions to be applied to vehicle-wheels.

My invention consists in the various constructions and combinations of parts hereinafter described, and set forth in the claims.

Figure 4:
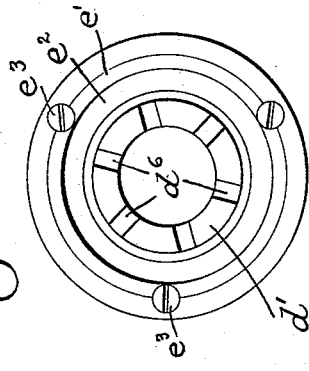
Figure 3:
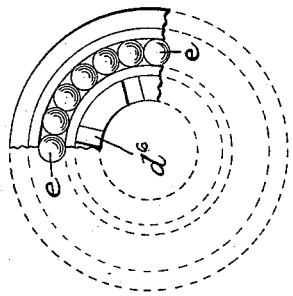
Figure 2:
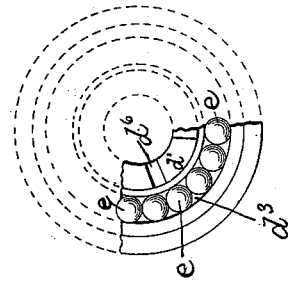
Figure 7:
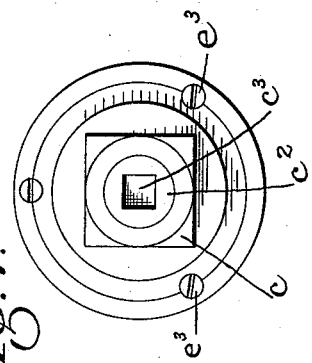
Figure 6:
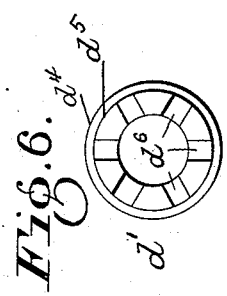
Figure 5:
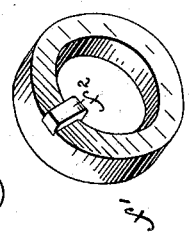

In the accompanying drawings, which form a part of this specification, Figure 1 is a longitudinal sectional view illustrating a wheel-hub and axle with my improved antifriction-bearing applied thereto. Figs. 2 and 3 are detail views of parts of the same. Fig. 4 is an end elevation of the rear portion of the bearing removed from the axle. Figs. 5 and 6 are detail views of some of the portions of the front end of the axle. Fig 7 is an end elevation showing the retaining and adjusting devices.

Like parts are represented by similar letters of reference in the several views.

In the said drawings $a\,a$ represent the hub of an ordinary vehicle-wheel, and $b$ is the axle. The axle is provided with a collar $b'$, on the periphery of which is an annular flange $b^2$ projecting laterally therefrom. The hub $a$ is provided with an inner sleeve $a'$, each end of which is enlarged into a chamber $a^2$, the sleeve $a'$ being made in two parts, preferably screw-threaded, so as to be joined together, as shown at $a^3$, for the purpose of inserting the sleeve with the enlarged chambers $a^2$ into the hub. The axle $b$ is preferably shouldered down at its front end to a reduced diameter, as shown at $b^3$, and is screw-threaded, as indicated at $b^4$. On the screw-threaded end $b^4$ of the axle is adapted to screw a nut $c$, which is preferably provided near its periphery with an annular flange $c'$ projecting laterally therefrom to form a cap and corresponding in shape to the flange $b^2$ on the collar $b'$ of the axle. The nut $c$ is extended beyond the end of the axle, and within the screw-threaded portion thereof is inserted an auxiliary nut $c^2$, provided with an opening $c^3$, preferably in the center thereof and square in cross-section.

In each of the chambers $a^2$ is placed an annular bearing-ring $d$ in the nature of a sleeve, the periphery being shaped to conform to the inside of the chamber $a^2$ and the inner wall being beveled, as shown, from the inside outwardly, so as to form a conical seat or wearing-face. Within this bearing-ring is a second sleeve $d'$, the periphery of which is beveled or cone-shaped and adapted to fit within the outer bearing-ring $d$ and leave an annular wedge-shaped space $d^3$ between the same, the inner wall of said sleeve $d'$ being constructed to conform to the size and shape of the axle $b$, on which it is adapted to fit. Within this annular wedge-shaped space $d^3$ is placed a series of rollers $e$, each of which is tapered or cone-shaped to correspond to the wedge-shaped opening, the respective ends of said rollers being each of a diameter directly proportionate to the diameter of the inner sleeve at the point at which said rollers contact therewith, so that said rollers will revolve around said sleeve and in contact therewith, but maintain their proper position in the radial planes extending through the center of said axle. The bearing-rings, sleeves, and tapered rollers at each end are held in position in the chambers $a^2$ by means of a ring $e'$, which is provided on its outer face with an annular groove $e^2$. This ring is adapted to bear against the end of the bearing-ring $d$ and against a shoulder $d^4$ on the sleeve $d'$, said sleeve $d'$ being shouldered down to a smaller diameter, as indicated at $d^5$, to receive said ring and permit it to engage with said shoulder $d^4$, as shown. The ring $d$ is held firmly in place within the chamber $a^2$ by small retaining-screws $e^3$, which engage in the wall of said chamber and in said ring, said screws being provided with heads which are countersunk, so as to lie half in the ring and half in the outer casing of the chamber, as shown in Figs. 4 and 7. As thus constructed, it will be seen that the bearing proper, which includes the chamber, the two bearing-sleeves, the rollers, and the retaining-ring, is held securely in the hub, no matter whether in place on the axle or otherwise. When assembled for operation, the flange $b^2$ on the axle-collar $b'$ and the flange $c'$ on the nut $c$ engage in the annular grooves $e^2$ in said retaining-rings, the construction being such that it is practically impossible for dirt to get into the bearing-surfaces.

The nut $c$ is adapted to bear (preferably through intermediate agencies) against the end of the bearing-sleeve $d'$ at the outer end of the axle, and when screwed onto said axle, so that the auxiliary nut $c^2$ comes in contact with the end of said axle, the parts are in their proper operative position. By adjusting the auxiliary nut $c^2$, with reference to the main nut $c$, the main nut $c$ may be adjusted to a greater or less extent on the axle and thus adjust the position of the respective bearing-sleeves $d'$ into the chambers and in contact with the friction-rollers, said sleeves being free to move inwardly, but retained against outward movement by the retaining-ring, which is shouldered thereon. To provide for varying the wearing-surfaces on the inner wearing-sleeves, intermeshing parts are employed for retaining said sleeves normally against revolution, but permitting them to be adjusted to different positions. This is accomplished by providing in one end of each of said sleeves a series of notches $d^6$. At the inner end the axle is provided with a stationary pin or projection $f$, adapted to fit in one of said notches when the wheel is on the axle, and thus retain said sleeve against revolution thereon. At the opposite end an interposed collar $f'$ is employed between the retaining-nut and the said sleeve. This collar is provided at one point with a projecting key $f^2$, which projects from one end thereof, and also inwardly in the opening through the same. The axle is provided with a slot or key-seat $f^3$, in which said key is adapted to fit, so that this collar always maintains the same position with reference to the axle. The bearing-sleeve $d'$, however, may be adjusted to any desired position by bringing any one of the notches $d^6$ opposite said projection, so that it engages therewith.

It will be seen that by the construction thus described I provide an antifriction-bearing for vehicles, which is at once simple and at the same time capable of ready adjustment to compensate for any wear thereon. The wheel may be taken off or replaced on the axle without disturbing any of the wearing-surfaces so long as the auxiliary adjusting-nut is unchanged. As the wheel is replaced after being removed from the axle the probabilities are that the same notches in the ends of the collars will not engage the retaining-projections, so that the sleeves $d'$ will naturally be turned from time to time so as to bring a new wearing-surface thereon, or it is evident that, if desired, they can readily be adjusted to any position to compensate for wear by removing the spindle-nut until the sleeves can be disengaged from the projections and turning each or either of said sleeves until a different notch is brought opposite the proper engaging projection.

I have shown the auxiliary nut $c^2$ provided with a square opening $c^3$ extending entirely through the same. It is obvious that this may be made in the form of a socket extending only partially through the nut, or the nut may be provided with any other means for turning the same to adjust it in the main nut or cap $c$.

While the bearing-rings $d$, separate from the chambers and fitted therein, are preferably employed, it is obvious that the inclined walls or seats might be formed in the chambers themselves, in which case the bearing-ring, as a separate element, would be dispensed with.

Having thus described my invention, I claim—

1. In an antifriction bearing, a chamber having therein an inclined or tapered seat, a bearing sleeve within said chamber, and a series of tapered rollers disposed around said sleeve and within said chamber, the small ends of said rollers being arranged opposite the small end of said sleeve so that the rollers travel uniformly around said sleeve, and means as described for retaining said sleeve and rollers in said chamber and for adjusting the parts of the same to compensate for the wear thereon, substantially as specified.

2. In an antifriction bearing, a chamber having therein a bearing ring, a spindle extending through said chamber having thereon a movable conical sleeve, tapered rollers between said bearing ring and sleeve, the small end of each of said rollers being opposite the small end of said sleeve, a retaining ring having an annular groove and secured in said chamber so as to close the opening between said sleeve and bearing ring within which the rollers are inserted and a cap at the end of said chamber having a laterally-projecting flange to fit in said groove, substantially as specified.

3. The combination with a chamber having therein a bearing ring with a tapered opening to form an inclined bearing surface, a sleeve arranged within said ring and tapered rollers between said sleeve and ring, of a spindle around which said sleeve is mounted, and means, as described, for securing said sleeve on said spindle in different positions of adjustment around said spindle, substantially as specified.

4. The combination with an outer chamber, and a spindle extending through said chamber, a tapered seat in said chamber, and a conical sleeve on said spindle, intermeshing parts on said sleeve and spindle to cause said sleeve to retain the same relative position with reference to said spindle when the device is in operation, tapered rollers between said sleeve and seat, said intermeshing parts being so constructed as to permit of an adjustment of said sleeve about said spindle, substantially as specified.

5. The combination with a vehicle hub having a chamber at each end thereof with tapered seats therein, of a spindle extending through said hub and through said chambers, conical bearing sleeves on said spindle adapted to extend into said tapered seats, tapered rollers between said sleeves and seats, grooved retaining rings for holding said sleeves and rollers in said chambers, a stationary collar on said spindle having a lateral flange to engage with the grooved ring at one end of said hub, and a movable collar having a flange to engage with the grooved ring in the opposite end of said hub, and means, substantially as described, for retaining said movable collar in different positions of adjustment on said spindle, substantially as specified.

6. The combination with a vehicle hub having at each end thereof a chamber with a tapered or inclined inner wall therein adapted to form a bearing seat, a spindle extending through said hub, a conical sleeve at each end of said spindle adapted to project into one of said chambers, tapered rollers between said sleeves and bearing seats, a stationary collar on said spindle adapted to contact with the sleeve at one end thereof, and a screwthreaded nut on said spindle adapted to move the conical sleeve at the other end of said spindle, intermeshing parts on the spindle and sleeves, respectively, to prevent said sleeves from turning on said spindle when the devices are in position for operation, said parts being so constructed that the sleeves may be placed in different positions around said spindle, substantially as and for the purpose specified.

7. The combination with a spindle and a hub having a chamber therein, a tapered seat in said chamber, and a conical sleeve on said spindle, tapered rollers between said seat and sleeve, and a grooved retaining ring secured in said chamber so as to close the opening between said sleeve and seat and retain the rollers therein, a movable cap screwthreaded on said spindle and provided with a laterally projecting flange to engage in said grooved ring, said cap being provided with an auxiliary adjusting nut by means of which its position on said spindle may be determined, substantially as specified.

8. The combination with a vehicle hub and a spindle therefor, a conical sleeve on said spindle, and a conical or tapered seat in said hub, conical rollers between said sleeve and bearing surface, said sleeve being shouldered down to receive a grooved ring which fits thereon, said ring being also adapted to close the end of said hub and retain said rollers, engaging parts on said spindle and sleeve respectively by means of which said sleeve may be retained in different positions of adjustment about said spindle, a screwthreaded cap on said spindle having a projecting flange to engage in said grooved ring and adapted to bear against the end of said conical sleeve, and an auxiliary nut screwthreaded in said cap so as to contact with the end of said spindle and thus determine the adjustment of said cap on said spindle, substantially as specified.

9. A vehicle hub having a chamber at each end, and a spindle adapted to extend through said hub, said spindle being shouldered down or reduced and screwthreaded at one end, a stationary collar having a projecting flange at the inner end of said spindle, a movable cap having a projecting flange at the outer or screwthreaded end of said spindle, conical sleeves arranged on said spindle between said stationary collar and movable cap, one of said sleeves being fitted onto the main body of said spindle and the other on the reduced portion thereof, an inclined bearing seat within each of said chambers, tapered rollers within said chambers between the conical sleeves and tapered seats respectively, grooved retaining rings in the ends of said chambers, each of said rings being fitted to the end of one of said sleeves which is shouldered down to receive the same, and projecting flanges on the respective collars to engage said grooved rings, intermeshing parts on said spindle and sleeves respectively, said intermeshing parts being so formed as to permit of an adjustment of said sleeves around said spindle, substantially as specified.

10. The combination with a chamber and an inclined seat therein, a spindle having a conical sleeve thereon to project into said chamber, tapered rollers between said sleeve and seat, a grooved retaining ring secured in the end of said sleeve and adapted to bear against a shoulder or projection on said sleeve, a movable cap having a laterally projecting flange to engage in said groove, a movable collar on said spindle between said cap and sleeve, said collar having a projection to engage said spindle and sleeve respectively, and said sleeve being provided with a series of notches adapted to engage said collar in different positions of adjustment, substantially as specified.

In testimony whereof I have hereunto set my hand this 12th day of November, A. D. 1894.

ARTHUR W. GRANT.

Witnesses:
OLIVER H. MILLER,
CHAS. I. WELCH.